(12) United States Patent
Kemp

(10) Patent No.: US 8,666,915 B2
(45) Date of Patent: Mar. 4, 2014

(54) METHOD AND DEVICE FOR INFORMATION RETRIEVAL

(75) Inventor: Thomas Kemp, Esslingen (DE)

(73) Assignee: SONY Corporation, Tokyo (JP)

( * ) Notice: Subject to any disclaimer, the term of this patent is extended or adjusted under 35 U.S.C. 154(b) by 349 days.

(21) Appl. No.: 13/114,509

(22) Filed: May 24, 2011

(65) Prior Publication Data

US 2011/0302115 A1 Dec. 8, 2011

(30) Foreign Application Priority Data

Jun. 2, 2010 (EP) ..................................... 10005769

(51) Int. Cl.
*G06F 15/18* (2006.01)

(52) U.S. Cl.
USPC .......................................................... 706/12

(58) Field of Classification Search
USPC ..................................................... 706/12, 62
See application file for complete search history.

(56) References Cited

U.S. PATENT DOCUMENTS

| | | | |
|---|---|---|---|
| 6,687,696 B2 | 2/2004 | Hofmann et al. | |
| 7,130,837 B2 | 10/2006 | Tsochantaridis et al. | |
| 2006/0242140 A1 | 10/2006 | Wnek | |
| 2006/0242190 A1 | 10/2006 | Wnek | |
| 2008/0249999 A1 | 10/2008 | Renders et al. | |
| 2011/0161311 A1* | 6/2011 | Mishne et al. | 707/719 |

OTHER PUBLICATIONS

Yoshii et al, "Continuous PLSI and Smoothing Techniques for Hybrid Music Recommendation", 10th International Society for Music Information Retrieval Conference (ISMIR 2009).*

Park et al, "Efficient storage and retrieval of probabilistic latent semantic information for information retrieval", Published online: Feb. 28, 2008, Springer-Verlag 2008,The VLDB Journal (Jan. 2009) 18:141-155.*

Aart et al, "The NoTube BeanCounter: Aggregating User Data for Television Programme Recommendation", Workshop Social Data on the Web, 2008.*

Hinneburg et al, "Bayesian Folding-In with Dirichlet Kernels for PLSI", Seventh IEEE International Conference on Data Mining, 2007 IEEE, DOI 10.1109 / ICDM.2007.15.*

Wei et al, "LDA-Based Document Models for Ad-hoc Retrieval", SIGIR'06, Aug. 6-11, 2006, Seattle, WA, USA, Copyright 2006 ACM.*

Bai et al, "Investigation of Partial Query Proximity in Web Search", WWW 2008 / Poster Paper Apr. 21-25, 2008 • Beijing, China.*

Cai et al, "Modeling Hidden Topics on Document Manifold", CIKM'08, Oct. 26-30, 2008, Napa Valley, California, USA, Copyright 2008 ACM.*

Girolami et al, "On an Equivalence between PLSI and LDA", SIGIR'03, Jul. 28-Aug. 1, 2003, Toronto, Canada.*

Wei, "Topic Models in Information Retrieval", University of Massachusetts Amherst, Aug. 2007.*

(Continued)

*Primary Examiner* — Jeffrey A Gaffin
*Assistant Examiner* — Ilya Traktovenko
(74) *Attorney, Agent, or Firm* — Oblon, Spivak, McClelland, Maier & Neustadt, L.L.P.

(57) ABSTRACT

A method of information retrieval that includes determining Q generative models ($\lambda$) in accordance with Probabilistic Latent Semantic Indexing (PLSI). The Q generative models are determined in offline training. The method also includes receiving a user query (q), choosing N generative models out of the Q generative models, and determining a content item (d) based on the query and a combination of the N generative models.

13 Claims, 3 Drawing Sheets

(56) References Cited

OTHER PUBLICATIONS

Ben He et al., "A Query-based Pre-retrieval Model Selection Approach to Information Retrieval", Proceedings of RIAO 2004, 2004, 14 Pages.

Rong Yan et al., "Learning Query-Class Dependent Weights in Automatic Video Retrieval", Proceedings of ACM Multimedia 2004, Oct. 10-16, 2004, 8 Pages.

Jen-Tzung Chien et al., "Adaptive Bayesian Latent Semantic Analysis", Audio, Speech, and Language Processing, IEEE Transactions on, vol. 16, Issue 1, Jan. 2008, 1 Page.

Shi-Yong Neo et al., "News Video Retrieval using Multi-modal Query-dependent Model and Parallel Text Corpus", Proceedings of 'Multimedia Information Retrieval' Workshop, in SIGIR '05, Aug. 2005, 8 Pages.

Thomas Hofmann, Latent Semantic Models for Collaborative Filtering', ACM Transactions on Information Systems, vol. 22, No. 1, Jan. 2004, 27 Pages.

Thomas Hofmann, "Probabilistic Latent Semantic Indexing", Proceedings of the Twenty-Second Annual International SIGIR Conference on Research and Development in Information Retrieval, 1999, 8 Pages.

Thomas Hofmann, "Probabilistic Latent Semantic Analysis", Uncertainity in Artificial Intelligence, 1999, 8 Pages.

Alexander Hinneburg et al., "Bayesian Folding-In with Dirchlet Kernels for PLSI", ICDM '07 Proceedings of the 2007 Seventh IEEE International Conference on Data Mining, 2007, 6 Pages.

Thomas Hofmann, "Unsupervised Learning by Probabilistic Latent Semantic Analysis", Machine Learning, 2001, 20 Pages.

\* cited by examiner

METHOD AND DEVICE FOR INFORMATION RETRIEVAL

An embodiment of the invention relates to a method for information retrieval. Further embodiments of the invention relate to a device adapted to input a user query and output a user desired information. A still further embodiment relates to a television equipment.

BACKGROUND

With the advent of digital databases and communication networks, huge repositories of textual, multimedia and other content data have become available to a large public. Today it is one of the great challenges in the information sciences to develop intelligent interfaces for human-machine interaction which support computer users in their quest for relevant information.

It is an object of embodiments of the present invention to provide a method for information retrieval, wherein the retrieved information is more relevant with respect to a user query than in the prior art. A further object is to provide a respective device. A still further object is to provide the user with a program suggestion based on electronic program guide (EPG) data.

These objectives are solved by the independent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
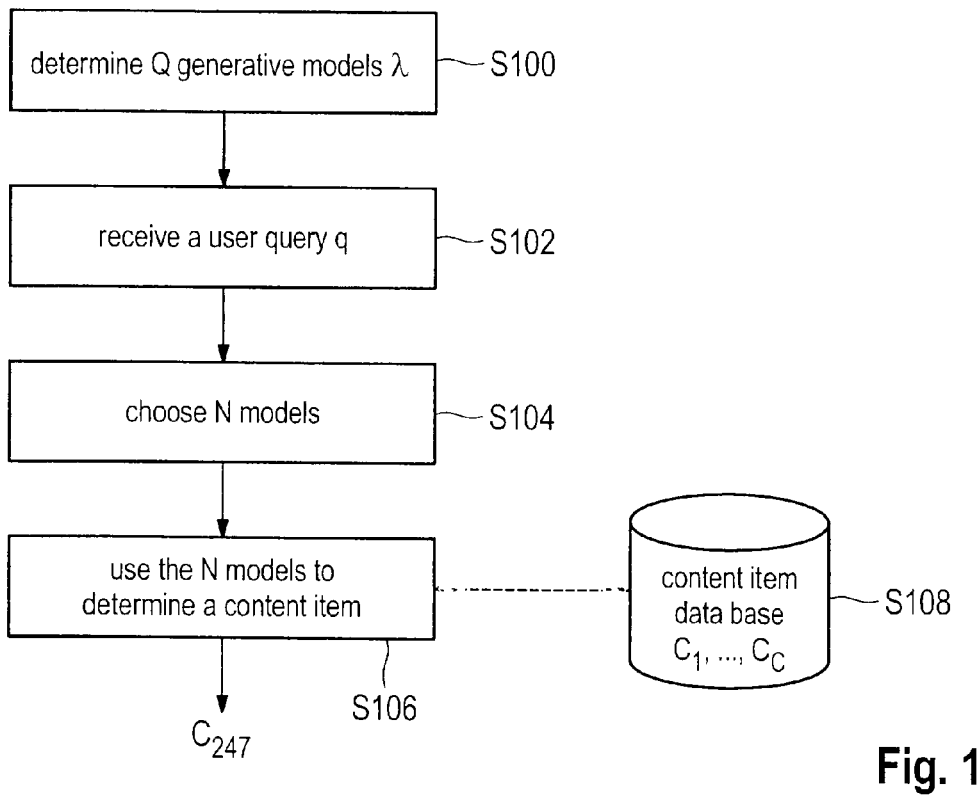
FIG. 1 shows a diagram for illustrating a method for information retrieval.

FIG. 1 shows an embodiment of a method of information retrieval. As will be known by persons skilled in the art, PLSI (probabilistic latent semantic indexing) is a technique which aims at creating a generative model that predicts the likelihood of the joint observation of a term and a document (which can be used to compute the probability of a document given a query $p(d|q)$). The generative model $\lambda$ consists of two parts, an aspect model $p(t|a)$ which models for each aspect a the probability to observe a term t, and the decomposition model $p(a|d)$, which gives the decomposition of each document into aspects.

PLSI is e.g. described in the publication "Probabilistic latent semantic indexing", by Thomas Hofmann in Proceedings of the 22nd annual international ACM SIGIR conference on Research and development in information retrieval table of contents Berkeley, Calif., United States, pages 50 to 57, year of publication: 1999, ISBN:1-58113-096-1. This publication is herewith incorporated by reference.

It is known that a single such model $\lambda$ does not possess enough prediction power and therefore, multiple models $\lambda_i$ are typically combined linearly to a final likelihood $p(d|q)$. The set of models $\lambda_i$, the set comprising a total of N models, is computed off-line and remains static during the actual usage of the models. Normally, the size N of the model set is chosen in advance, compromising between system execution time and an increased quality of the recommendations as more models are added.

In the embodiment of FIG. 1, however, the models $\lambda_i$ are chosen (at S104, cf. for more details below), conditioned on a query q. That means, instead of computing N models during off line model preparation, a higher number Q of models is computed at S100. All of the Q models are initialized randomly and created in the same way as in standard PLSI. Any scheme that is currently used to increase the quality, coverage, versatility etc. of the PLSI models can be used as usual.

An advantage of choosing the models, e.g. at run time, conditioned on a query q is that the rate for finding relevant information (e.g. ranking of content items) can be improved in comparison to the prior art.

As shown at S102, a user query q might be received at some time.

Then, at S104, as already mentioned, N generative models $\lambda_1, \ldots, \lambda_N$ are chosen out of the Q generative models. The N models might, therefore, also be referred to as subset of the Q models. The choosing may be dependent on the query q.

Q may e.g. be roughly 4 times larger than N. Q might also be 2-6 times larger then N. Depending on the available processing power and/or on the application, e.g. the size of a content item data base or the like, the ratio Q/N might also be different. E.g. it might be 10 or more. When setting the ration Q/N to 4, this is mostly for computational efficiency. There is no other reason why Q could not be chosen higher. Typical values for N might be between 16 and 128; which could result in Q somewhere from 64 to 512 or so.

The choosing of the N models at S104 may be based on calculating a value based on a quality estimation function QEF, i.e. for all Q models a value based on the QEF may be determined. Then, the N models may correspond to models having a value above a threshold (cf. also FIG. 4).

The quality estimation function may be determined based on a cross validation data set, leaving-one-out prediction, and/or half-query prediction. In case of using a cross validation data set the choosing of the N models out of the Q models may also be referred to as "static model picking". In case of using leaving-one-out prediction and/or half-query prediction, the choosing of the N models out of the Q models may also be referred to as "dynamic model picking".

In the static model picking, the N models may be chosen from the Q existing models (the model pool) independent of the query. Effectively, the best subset of N models taken from the model pool is searched and used at S106 (cf. below for more details on the usage of the N models). For this, it is necessary to predict the quality of a subset of models given no information about the future queries. Such a prediction can be based on a small held-out set of questions with known answers (a crossvalidation set), or on leaving-one-out prediction (see below), or on half-query prediction (see below). Whatever the quality estimation function, basically the set of N models is fixed after the selection is done, and therefore, the static model picking is an improved way of generating the N models $\lambda_i$.

In dynamic model picking, the N models are chosen from the Q existing models dependent on the query. This means, that a model picking step is introduced which has to be run more frequently, e.g. every time a query has to be answered/is received. Of course, if a server is under high load, the 'old' model set (from static model picking, or just from the last query of that user) could be re-used, saving the computational time necessary for the model picking step.

The model picking step picks a subset of models from the model pool which will then provide the best possible quality of answers for the current query. This does not have to be true for queries in general. For example, if there is a model in the pool which has an aspect that specializes on animals in africa, this aspect of this model is particularly well suited for the query, and therefore, the corresponding model should be used in the final model set. For a different query, e.g. about the difference between routers and switches, a model that puts focus on animals in Africa versus other animals just 'steals' precious modeling power from the technical topics, and therefore should not be used. It is the purpose of the model picking step to select the models from the pool that fit well to the query at hand.

Figure 4:
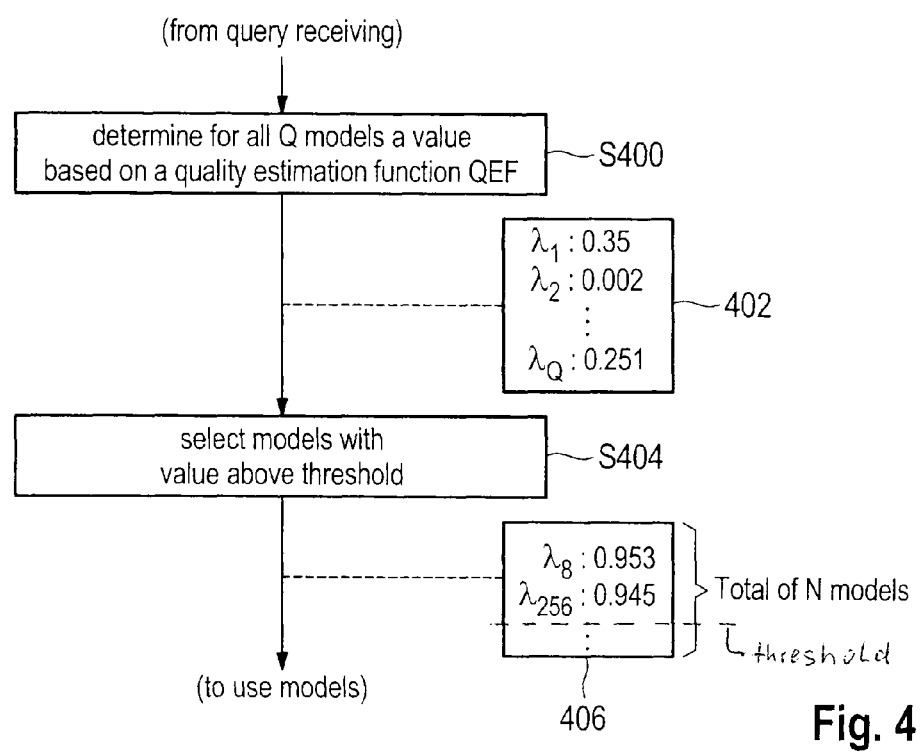
FIG. 4 depicts steps of the model selection.

When using leaving-one-out prediction and/or half query prediction, the algorithm is run separately on each model, and the best-scoring N models are finally chosen (cf. also FIG. 4).

In half query prediction (cf. also FIG. 5), the query is split into two half queries, the first half of the query and the second half. Then, folding in (as in standard PLSI) is used to estimate p(a|q) with q being the first half of the query (as usual, p(t|a) is not modified during folding in), and 'a' in p(a|q) representing a corresponding aspect. Then, the probability to 'see' (observe) the second half of the query is computed in the standard way. In this case, the second half of the query is treated just as a document of the collection. The probability to see the second half, given the first half, is stored. Now, the role of predictor and prediction source is reversed: p(a|q) is recomputed (folding in) with q being the second half of the original query, and using this decomposition p(a|q), the probability of the first half of the query is computed. The two probabilities are then added to yield the final objective function of half query prediction.

In leaving one out prediction, the procedure is essentially similar. However, in this case, the folding in is done with all terms but one of the initial input query. And the prediction tries to predict only the single remaining held-out word. After the probability of this word has been computed, the folding in is repeated, but this time another word is omitted from folding in (and then, the probability of this other word is computed). The process is repeated until all words have been predicted exactly once. The sum of all the individual prediction probabilities is the objective function (QEF) of the leaving one out prediction.

During run-time, similar to the standard scheme, also N models are used and interpolated at S106. As shown as an example, at S106, the N models are used to select a content item from a content item data base 108 depending on query q. In the example of FIG. 1, a content item $c_{247}$ is selected from data base 108. A "content item" could e.g. be a web page, a piece of music, a television program, a document, and/or a mixture of all of such types of items. In fact, there is no limitation to what a content item is. It could be any kind of entity in any kind of data base in which a user is looking for information (i.e. one or more items) relevant to his query.

According to a further embodiment it is possible that the data base 108 comprises EPG data items and the query q might also be related to EPG data. For example, the user might just watch something on television he likes. In this case, a television set, set top box and so on (television equipment), might allow the user to find similar television programs easily, e.g. by pressing a button. Thus, EPG data of the program the user is currently watching might be used as the query and the television set, set top box etc. would display to the user similar programs retrieved from the data base 108.

Figure 2:
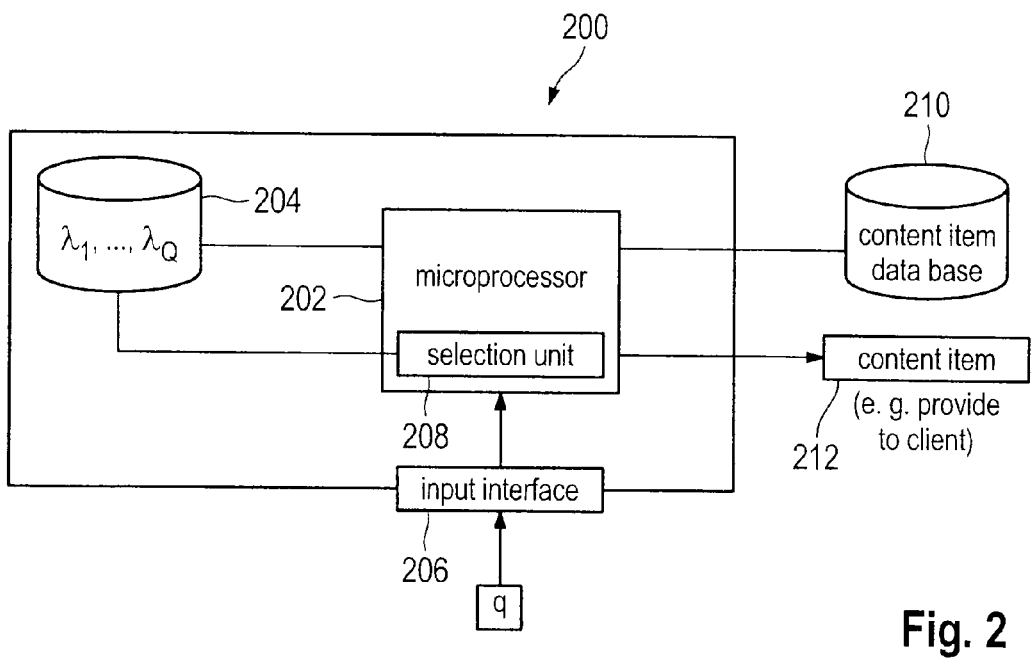
FIG. 2 shows an embodiment of a device adapted to receive a user query and to output a content item relevant with respect to the query.

FIG. 2 shows a device 200 according to a further embodiment of the invention. The device 200 includes a microprocessor 202, a storage 204, an input interface 206, and a selection unit 208.

Microprocessor 202 is adapted to calculate Q generative models $\lambda_1, \ldots, \lambda_Q$ in accordance with Probabilistic Latent Semantic Indexing (PLSI). Thereby, as described above in connection with FIG. 1, the Q generative models might be determined in an offline training.

Storage 204 is adapted to store the Q generative models $\lambda_1, \ldots, \lambda_Q$.

Input interface 206 is adapted to receive a user query q.

Further, the selection unit 208 is adapted to select N generative models $\lambda_1, \ldots, \lambda_N$ out of the Q generative models $\lambda_1, \ldots, \lambda_Q$, wherein N<Q.

Once the selection unit 208 selected N generative models $\lambda_1, \ldots, \lambda_N$, microprocessor 202 may use these N models to determine a content item based on the query q and a combination of the N generative models. In the example of FIG. 2, a content item 212 is selected from a content item database 210.

A device 200 might e.g. be a server, a personal computer, a portable computer, a mobile phone, a video recording device. In other embodiments, device 200 might also be a "television equipment", e.g. a television set, set top box, or the like. Moreover, in further embodiments (not shown), the content item database 210 might be at least partly stored within device 200 and/or downloaded from the internet. For example, if device 200 is a television equipment, the content item database could be downloaded at regular intervals from the internet or via other transmission channels, e.g. via satellite, cable or the like according to any kind of protocol, e.g. a protocol used for an EPG of the television equipment.

If device 200 is a television equipment, the content item 212 might be displayed to a user. The user might select a content item and then be directed to viewing or recording a corresponding television program. Thus, a content item could be a television program, music channel or the like.

Figure 3:
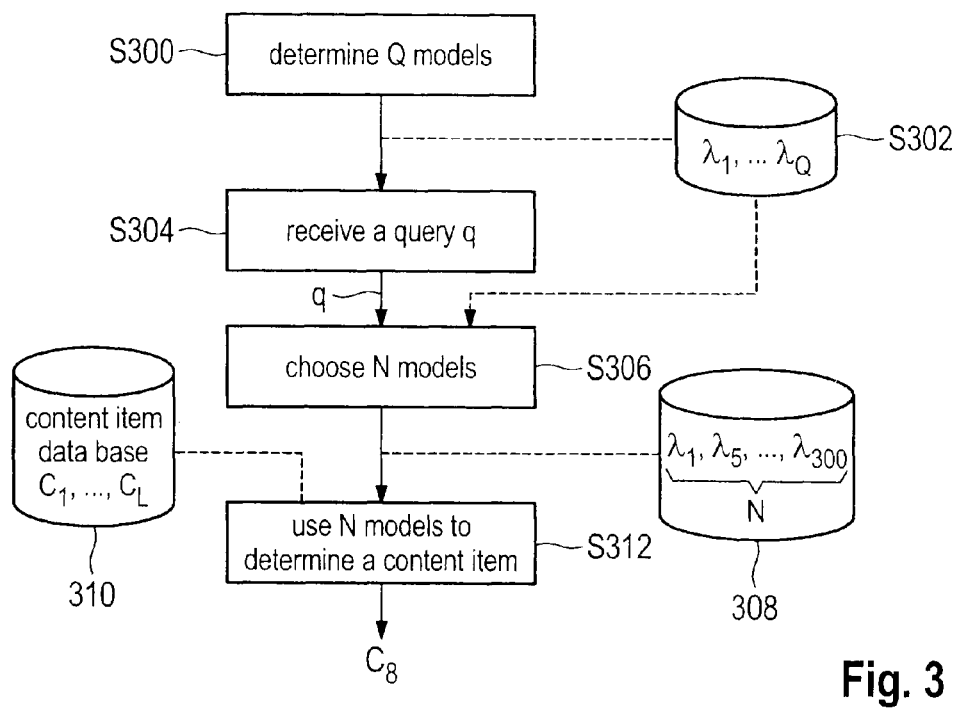
FIG. 3 shows a further diagram of an embodiment of the invention.

FIG. 3 shows a further flowchart depicting the method for information retrieval. As seen at S300 Q generative models might be determined. These Q models might be stored in a database 302. Then, at S304, a query q is received from a user.

At S306, the query q is used to choose N models from the database 302. In the example of FIG. 3, N=300. As seen, the N models might be stored in a further database 308.

Then, at S312 the N models are used to determine a content item out of a content item database 310. In the example of FIG. 3, it is assume that a content item $c_8$ is selected from the content item database 310 including content items $c_1, \ldots, c_L$.

FIG. 4 shows more details of the model selection, i.e. choosing N models out of Q models.

At S400, for all Q models a value is determined based on a quality estimation function QEF.

In an actual use case, a result might look as depicted at 402. As seen at 402 for each model $\lambda_1, \ldots, \lambda_Q$ a specific value has been determined (e.g. 0.35 for model $\lambda_1$, 0.002 for model $\lambda_2$, and so on).

Then, as seen at S404, models might be selected with a value lying above a certain threshold. In other words, it may be that the Q models are sorted according to their determined value. This is depicted at 406. The total number of models having a value above the threshold might be the N models which are then used for determining a content item (cf. S106 in FIG. 1, and S312 in FIG. 3).

In the example of FIG. 4, it is assumed that the model $\lambda_8$ has a highest value of 0.953. Further, the model $\lambda_{256}$ has the second highest value of 0.945.

Thus, at least these models might be included in the set of N models.

Figure 5:
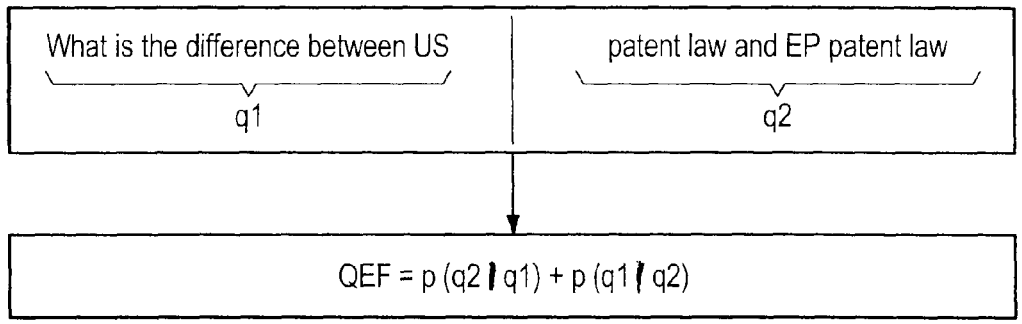
FIG. 5 shows an example for half-query prediction.

FIG. 5 shows an example for the above explained half-query-prediction. The user might have input a query "What is the difference between US patent law and EP patent law?".

According to the half-query-prediction algorithm, this query might be split in two parts, a first part q1 and a second part q2. Then, for determining the quality estimation function which is used for calculating the values as shown in FIG. 4, the probabilities p(q2|q1) and p(q1|q2) are calculated.

The quality estimation function QEF is given by $$QEF = p1(q2|q1) + p2(q1|q2).$$

Before determining p1, the folding-in technique of PLSI is used to estimate the PLSI decomposition model p(aspect|q1) (for all aspects) which is then used to determine p1.

Moreover, before determining p2, the folding-in technique of PLSI is used to estimate the PLSI decomposition model p(aspect|q2) (for all aspects) which is then used to determine p2.

Figure 6:
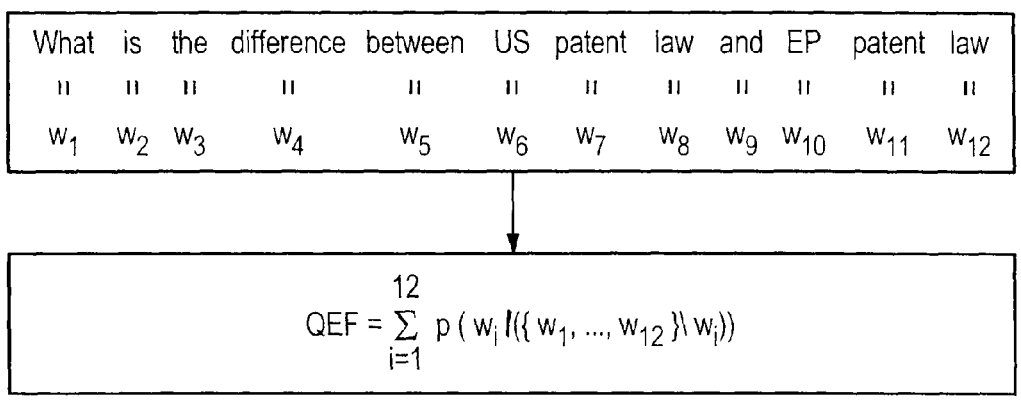
FIG. 6 shows an example for leaving-one-out prediction.

FIG. 6 shows an example of the leaving-one-out prediction. The user query is the same as that of FIG. 5: "What is the difference between US patent law and EP patent law?" As can be seen the query consists of twelve words $w_1, \ldots, w_{12}$.

The quality estimation function is in this case given by $$QEF = \sum_{i=1}^{12} p(w_i \mid (\{w_1, \ldots, w_{12}\} \backslash w_i))$$

As has been described above, embodiments of the invention are in the field of information retrieval (IR), and therefore, in the field of recommendation systems. In IR, the goal is to find relevant documents out of a large document collection, given a user query. For example, if the document collection is a library, and the user queries "I am interested in animals in Africa", the system should order all documents (books in the library) by relevance to the user query (e.g., the book 'A compendium about the Subsaharan Fauna' first, and 'Routers and Switches in the Internet Protocol' last).

Particularly, for TV program recommendation based on single items ("I liked this one, is there anything similar upcoming?"), the recommendation is essentially identical to an information retrieval task with the 'liked' items EPG description as query.

The above described "folding in" procedure is also described in the following two references:

[1] T. Hofmann, "Probabilistic Latent Semantic Indexing," *Proc. ACM SIGIR* '99, 1999.

[2] T. Hofmann, "Unsupervised Learning by Probabilistic Latent Semantic Analysis," *Machine Learning*, vol. 42, pp. 177-196, 2001.

Herewith, T. Hofmann, "Probabilistic Latent Semantic Indexing," *Proc. ACM SIGIR* '99, 1999 is incorporated by reference. Further, T. Hofmann, "Unsupervised Learning by Probabilistic Latent Semantic Analysis," *Machine Learning*, vol. 42, pp. 177-196, 2001 is also incorporated by reference.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method of information retrieval, comprising:
   determining, using a microprocessor, Q generative models (λ) in accordance with Probabilistic Latent Semantic Indexing (PLSI), said Q generative models being determined in an offline training;
   receiving a user query (q);
   choosing, using said microprocessor, N generative models out of the Q generative models, with N<Q; and
   determining, using said microprocessor, a content item (d) based on said query and a combination of the N generative models, wherein
   said step of choosing includes determining, for each of the Q generative models, a value based on a quality estimation function, wherein the N generative models are chosen depending on the value,
   the quality estimation function depends on the query, such that the choosing of the N generative models depends on the query, wherein the step of choosing is performed at runtime when the query is received, and
   the query comprises a plurality of N words w1, . . . , w–N, and the quality estimation function is given by $$\sum_{i=1}^{N} p(w_i \mid (\{w_1, \ldots, w_N\} \backslash w_i)),$$

$w_i$ representing the i-th word of the plurality of N words.

2. The method of claim 1, wherein Q is larger than N by a factor between 2 to 6.

3. The method of claim 1, wherein the quality estimation function is determined based on a cross validation data set, leaving-one-out prediction, and/or half-query prediction.

4. The method of claim 1, wherein the query is split into a first part q1 and a second part q2 and the quality estimation function depends on a first probability p1 and a second probability p2, wherein $p1 = p(q2|q1)$, and $p2 = p(q1|q2)$.

5. The method of claim 4, wherein, before determining p1, the folding-in technique of PLSI is used to estimate the PLSI decomposition model p(aspect|q1) which is then used to determine p1.

6. The method of claim 4, wherein, before determining p2, the folding-in technique of PLSI is used to estimate the PLSI decomposition model p(aspect|q2) which is then used to determine p2.

7. The method of claim 4, wherein the first part q1 corresponds substantially to the first half of the query and the second part q2 corresponds substantially to the second half of the query.

8. The method of claim 1, wherein the query comprises a plurality of N words w1, ..., w-N, and the quality estimation function depends on a probability p-loo, wherein for calculating p-loo a probability p3(x) is calculated, wherein p3(x)= p(w-x|r), wherein w-x is a word selected from the plurality of words w1, ..., w-N, and r represents all of the plurality of words w1, ..., w-N except w-x.

9. A method of claim 1, wherein a training material for said offline training includes Electronic Program Guide (EPG) data and said user query is related to finding EPG data.

10. A device comprising:
a microprocessor adapted to calculate Q generative models (λ) in accordance with Probabilistic Latent Semantic Indexing (PLSI), said Q generative models being determined in an offline training;
a storage adapted to store said Q generative models;
an input interface adapted to receive a user query (q); and
a selection unit adapted to select N generative models out of the Q generative models, with N<Q;
wherein said microprocessor is further adapted to determine a content item (d) based on said query and a combination of the N generative models, wherein
said selection unit is further adapted to determine, at runtime when a query has been received by the input interface, for each of the Q generative models, a value based on a quality estimation function,
the N generative models are chosen depending on the value,
the query comprises a plurality of N words w1, ..., w-N, and
the quality estimation function is given by $$\sum_{i=1}^{N} p(w_i | (\{w_1, \ldots, w_N\} \setminus w_i)),$$

$w_i$ representing the i-th word of the plurality of N words.

11. The device of claim 10, wherein said selection unit is further adapted to determine, at runtime when a query has been received by the input interface, for each of the Q generative models, a value based on a quality estimation function, wherein the N generative models are chosen depending on the value, wherein the quality estimation function depends on the query, wherein the query is split into a first part q1 and a second part q2 and the quality estimation function depends on a first probability p1 and a second probability p2, wherein $p1 = p(q2|q1)$, and $p2 = p(q1|q2)$.

12. The device of claim 10, wherein the device is a server and the input interface is adapted to receive the user query from a client.

13. A television equipment comprising:
a data processor adapted to calculate Q generative models (λ) in accordance with Probabilistic Latent Semantic Indexing (PLSI), said Q generative models being determined in an offline training, wherein a training material for said offline training comprises EPG data;
a storage adapted to store said Q generative models;
an input interface adapted to receive a user query (q), the user query being related to television program information; and
a selection unit adapted to select N generative models out of the Q generative models, with N<Q, wherein
said data processor is further adapted to determine a content item (d) based on said query and a combination of the N generative models, said content item being related to a television program, wherein
said selection unit is further adapted to determine, at runtime when a query has been received by the input interface, for each of the Q generative models, a value based on a quality estimation function,
the N generative models are chosen depending on the value,
the query comprises a plurality of N words w1, ..., w-N, and
the quality estimation function is given by $$\sum_{i=1}^{N} p(w_i | (\{w_1, \ldots, w_N\} \setminus w_i)),$$

$w_i$ representing the i-th word of the plurality of N words.

* * * * *